Figure 1:
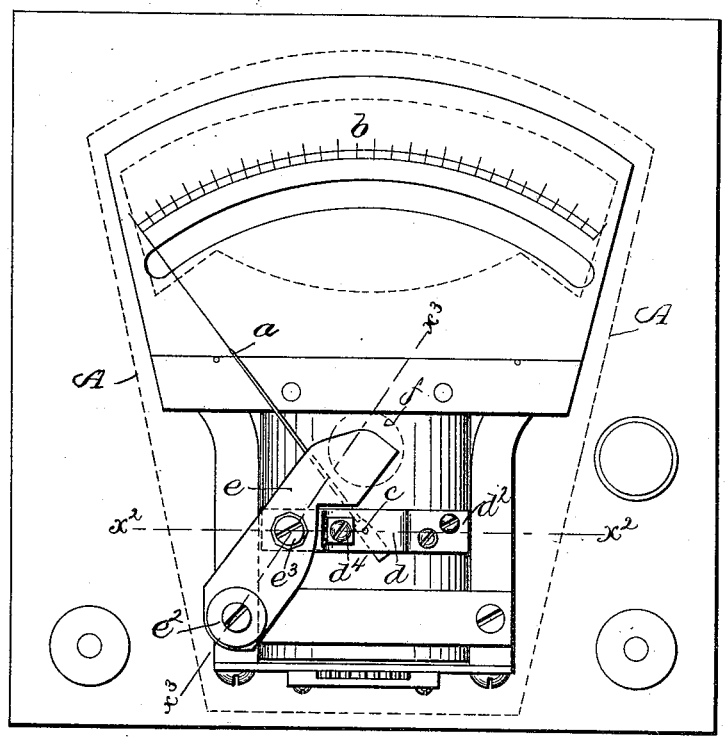

(No Model.)

A. H. HOYT.
ELECTRIC INDICATOR.

No. 512,250.  Patented Jan. 2, 1894.

Witnesses
Jas. J. Maloney
M. Esbee

Inventor,
Adrian H. Hoyt.
by Jas. P. Livermore
Att'y.

UNITED STATES PATENT OFFICE.

ADRIAN H. HOYT, OF MANCHESTER, NEW HAMPSHIRE, ASSIGNOR TO THE WHITNEY ELECTRICAL INSTRUMENT COMPANY, OF SACO, MAINE.

ELECTRIC INDICATOR.

SPECIFICATION forming part of Letters Patent No. 512,250, dated January 2, 1894.

Application filed March 15, 1893. Serial No. 466,012. (No model.)

*To all whom it may concern:*

Be it known that I, ADRIAN H. HOYT, of Manchester, county of Hillsborough, State of New Hampshire, have invented an Improvement in Electric Indicators, of which the following description, in connection with the accompanying drawings, is a specification, like letters on the drawings representing like parts.

My invention relates to electric indicators and is applicable to instruments known as galvanometers, ammeters, &c. In such instruments as commonly constructed the pointer or indicator and mechanism by which it is operated are inclosed in a case to protect them from dust and from atmospheric changes, and as the pointer and armature or needle by which it is carried are delicately balanced they will, when a current to be measured is passed through the instrument, be caused to vibrate or oscillate across the point where the pointer should stand to indicate the current that is being measured, and considerable time must elapse before the needle comes to rest so that the indicator can be read.

The object of the present invention is to provide a device under control of the operator by which the movement of the needle or pointer can be checked so that the pointer is quickly brought to rest at the proper position to indicate the current being measured, so that the reading can be made immediately after the current is applied.

The vibration checking device consists essentially of a movable bearing piece or presser adapted to bear on one end or pivot portion of the arbor of the needle or pointer so as to oppose a slight frictional resistance to the pivotal movement of the latter without positively arresting said movement. The said bearing piece may either be one of the pivot bearings of the arbor which is made movable for the purpose of pressing on the end of the arbor, or it may be an additional bearing piece movable toward and from the end of the arbor so that it may be pressed against the latter to check its movement and may subsequently be withdrawn so as to have such pressure relieved and thus leave the pointer perfectly free. A suitable knob or press button operated from the outside of the inclosing case may be employed to produce such pressure when desired, and when the current to be measured is first applied the operator presses the said button and thus slightly retards or opposes the movement of the pointer so that it is not carried by its momentum far beyond the point at which it should stand to indicate the current applied, although it moves nearly to said point and comes to rest where the opposing forces are nearly balanced so that when the operator relieves the pressure it will assume the exact position with scarcely any vibratory movement.

Figure 2:
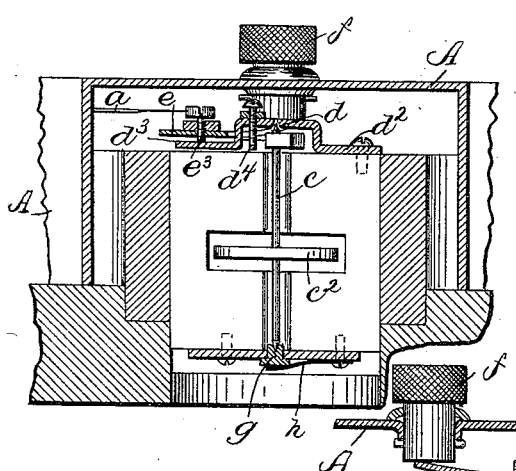
Figure 3:
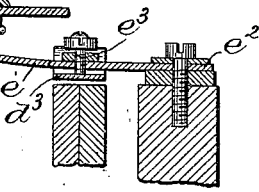
Figure 4:
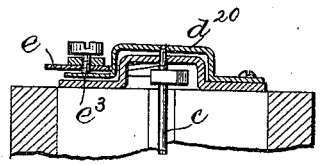

Figure 1 is a plan view of a sufficient portion of an indicating instrument to illustrate this invention; Fig. 2 a sectional detail thereof on line $x^2$, Fig. 1; Fig. 3 a sectional detail on line $x^3$, Fig. 1, and Fig. 4 a sectional detail showing a modified construction.

The invention is applicable to electric indicating instruments of various kinds, being shown in this instance as applied to an instrument containing a pointer $a$, co-operating with a graduated scale $b$ and actuated by a needle or armature influenced by the current to be measured in any suitable way, so that the pointer is caused to be moved by the force of the current applied to the instrument, and is moved a greater or less distance across the scale according as the current is stronger or weaker and may thus be used to indicate the strength of a given current. The said pointer and scale and actuating mechanism for the pointer are inclosed in a case A as nearly dust proof as possible having a transparent portion or sight opening through which the pointer and scale can be observed.

The pointer $a$ is connected with an arbor $c$ carrying the needle or armature $c^2$ which is moved by the force of the current to be measured in opposition to some directive force, these parts not being herein described in detail as their specific construction forms no part of the present invention. The said armature arbor is provided with pivot bearings at its ends which should be constructed to afford the freest possible pivotal movement in order that the pointer may position itself accurately at the point where the opposing forces are just balanced.

In order to prevent the pointer from being carried by its momentum past the point at which the opposing forces are balanced and from oscillating back and forth across said point, a pivot pressing device is employed which as shown in Figs. 1 and 2, is provided for by making the upper pivot bearing $d$ yielding, said bearing being shown as formed in a bridge piece of metal having one end $d^2$ rigidly supported on the stationary parts of the instrument, and its other end $d^3$ not supported so that the said bridge piece can be sprung a little toward and from the end of the arbor and normally stands in such position as to give the desired freedom to the movement of the arbor. When, however, it is desired to oppose a slight resistance to the movement of the arbor so as to prevent it from being thrown into oscillation, the end $d^3$, of the pivot piece is depressed slightly thus bringing a slight frictional pressure upon the end of the arbor sufficient to prevent it from acquiring great momentum although it does not positively restrain the movement of said armature which thus is carried by the force of the current to be measured, nearly to or only slightly beyond the proper point to indicate the amount of said current, and when the pressure on the arbor is relieved the latter is free to take exactly the required position at which it arrives with but little oscillatory movement. The stop $d^4$ limits the movement of the pivot pressing piece so that too great pressure will not be applied. The pivot pressing device, is as shown in this instance, depressed by means of a spring arm $e$ best shown in Fig. 3 connected at one end as $e^2$ with the stationary portion of the instrument, and extending across the free end of the bearing piece $d$, where the said arm $e$ is provided with an adjustable projection shown as a screw $e^3$ to bear on the free end of the bearing piece. The free end of the spring arm $e$ is under a knob or push button $f$ extending through the opening in the case A in which it is closely fitted or packed so as to exclude dust, the said knob $f$ being accessible outside of the case so that the operator by pressing down upon it bears the spring arm $e$ down upon the movable bearing piece which in turn presses on the end of the pivot and thus retards or dampens the movement of the pointer.

It is not essential that the bearing piece that presses upon the arbor so as to produce frictional resistance to its movement should also carry the pivotal bearing for the arbor as is the case in the construction shown in Figs. 1 and 2. If desired the said bearing piece may be independent of the bearing or socket for the end of the arbor as shown at $d^{20}$, Fig. 4. The said bearing piece $d^{20}$, has a spring movement toward and from the end of the arbor like the bearing piece $d$ Fig. 2, but does not like said bearing piece $d$ constitute the sole bearing for that end of the arbor which as shown works in the stationary bearing below the movable bearing piece or presser $d^{20}$, which latter, however, operates precisely like the movable bearing piece $d$ to check the movement of the pointer when required, or to leave it perfectly free when no checking is desired. The said movable bearing piece $d^{20}$, may be operated by a spring arm $e$ arranged and actuated by a knob or push button extending to the outside of the case as before described, or directly by a suitable push button or handle. If desired, the lower bearing step $g$ for the arbor $c$ may also be yielding, and normally supported by a spring $h$ as shown in Fig. 2, which spring would yield in case too great pressure should be brought upon the upper end of the arbor and would thus protect the arbor and pivots from damage and also limit the frictional resistance that could be applied to the arbor by the movement of the bearing piece or presser.

I claim—

1. The combination with the pointer or indicator of an electric measuring instrument and a pivoted arbor therefor with a movable bearing piece or presser adapted to bear upon the end of the arbor to produce frictional resistance to the movement thereof, substantially as and for the purpose described.

2. The combination of the pointer and its arbor with the movable bearing piece or presser, the spring arm, and knob for actuating the same, substantially as described.

3. The combination of the pointer and its arbor with a movable bearing piece or presser adapted to bear frictionally against one end thereof and a yielding pivot or step bearing at the other end of said arbor, substantially as and for the purpose described.

In testimony whereof I have signed my name to this specification in the presence of two subscribing witnesses.

ADRIAN H. HOYT.

Witnesses:
 Jos. P. Livermore,
 M. E. Hill.